(12) United States Patent
Hardy et al.

(10) Patent No.: US 9,477,602 B2
(45) Date of Patent: Oct. 25, 2016

(54) CACHE REFILL CONTROL

(75) Inventors: Remi Hardy, Mouans Sartoux (FR); Vincent Rezard, Villeneuve Loubet (FR)

(73) Assignee: Intel Deutschland GmbH, Neubiberg (DE)

( * ) Notice: Subject to any disclaimer, the term of this patent is extended or adjusted under 35 U.S.C. 154(b) by 1233 days.

(21) Appl. No.: 12/189,015

(22) Filed: Aug. 8, 2008

(65) Prior Publication Data

US 2010/0037026 A1    Feb. 11, 2010

(51) Int. Cl.
*G06F 12/08* (2016.01)

(52) U.S. Cl.
CPC ... *G06F 12/0859* (2013.01); *G06F 2212/1024* (2013.01); *G06F 2212/2022* (2013.01)

(58) Field of Classification Search
None
See application file for complete search history.

(56) References Cited

U.S. PATENT DOCUMENTS

| | | | | |
|---|---|---|---|---|
| 5,826,109 A | * | 10/1998 | Abramson | G06F 9/3824 710/240 |
| 5,918,247 A | * | 6/1999 | Patel | G06F 12/0859 711/137 |
| 6,148,367 A | * | 11/2000 | Tsuboi et al. | 711/113 |
| 6,715,035 B1 | * | 3/2004 | Colglazier et al. | 711/118 |
| 2006/0064549 A1 | * | 3/2006 | Wintergerst | 711/134 |
| 2008/0189487 A1 | * | 8/2008 | Craske | G06F 12/0859 711/125 |
| 2008/0235457 A1 | * | 9/2008 | Hasenplaugh et al. | 711/130 |
| 2009/0031088 A1 | * | 1/2009 | Donley | 711/147 |

\* cited by examiner

*Primary Examiner* — Yaima Rigol

(74) *Attorney, Agent, or Firm* — Eschweiler & Associates, LLC

(57) ABSTRACT

A method and a device are disclosed for a cache memory refill control.

19 Claims, 5 Drawing Sheets

CACHE REFILL CONTROL

BACKGROUND

Caching of data (including instructions) is typically used to increase performance of computing devices. The performance gains result from a core processor accessing frequently used data which is stored in a cache memory. The cache memory is typically smaller and more quickly accessible than main memory, which is typically slower. So long as the data to be accessed is present in the cache, system performance is enhanced. However, when requested data is not present in the cache, a cache miss occurs. This cache miss traditionally triggers a cache refill request and subsequent cache refill from the main memory.

The cache refill leads to a delay while the faster cache memory is refilled from the slower main memory. This delay is particularly acute when the main memory is flash memory, and in particular serial flash memory.

When serial flash memory is in use, the latency in code execution becomes severe during consecutive cache misses. For example, if there are two consecutive misses in the cache, the core processor must wait for the two cache line refills from the serial flash before the cache system can provide the second instruction. This leads to an unacceptable latency in code execution.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Described herein are techniques for setting a cache refill control. A threshold level is set and used to determine whether a cache refill should continue, resulting in a code execution delay in the process, or whether the cache refill should be stopped. The method may use one or more thresholds to determine when to stop or to continue the cache refill. The threshold may be based upon a word count, clock cycle, bit count, or other suitable parameter. The threshold may be either fixed or dynamically adjustable. This threshold may be set manually or automatically, by a user, by an optimization method, or by algorithm or other suitable process and may be set at time of manufacture, or at any other suitable time. While the examples and implementations discussed herein are given with respect to serially accessed memory, it is appreciated that other types of memory including, but not limited to, parallel memory may benefit as well.

Figure 1:
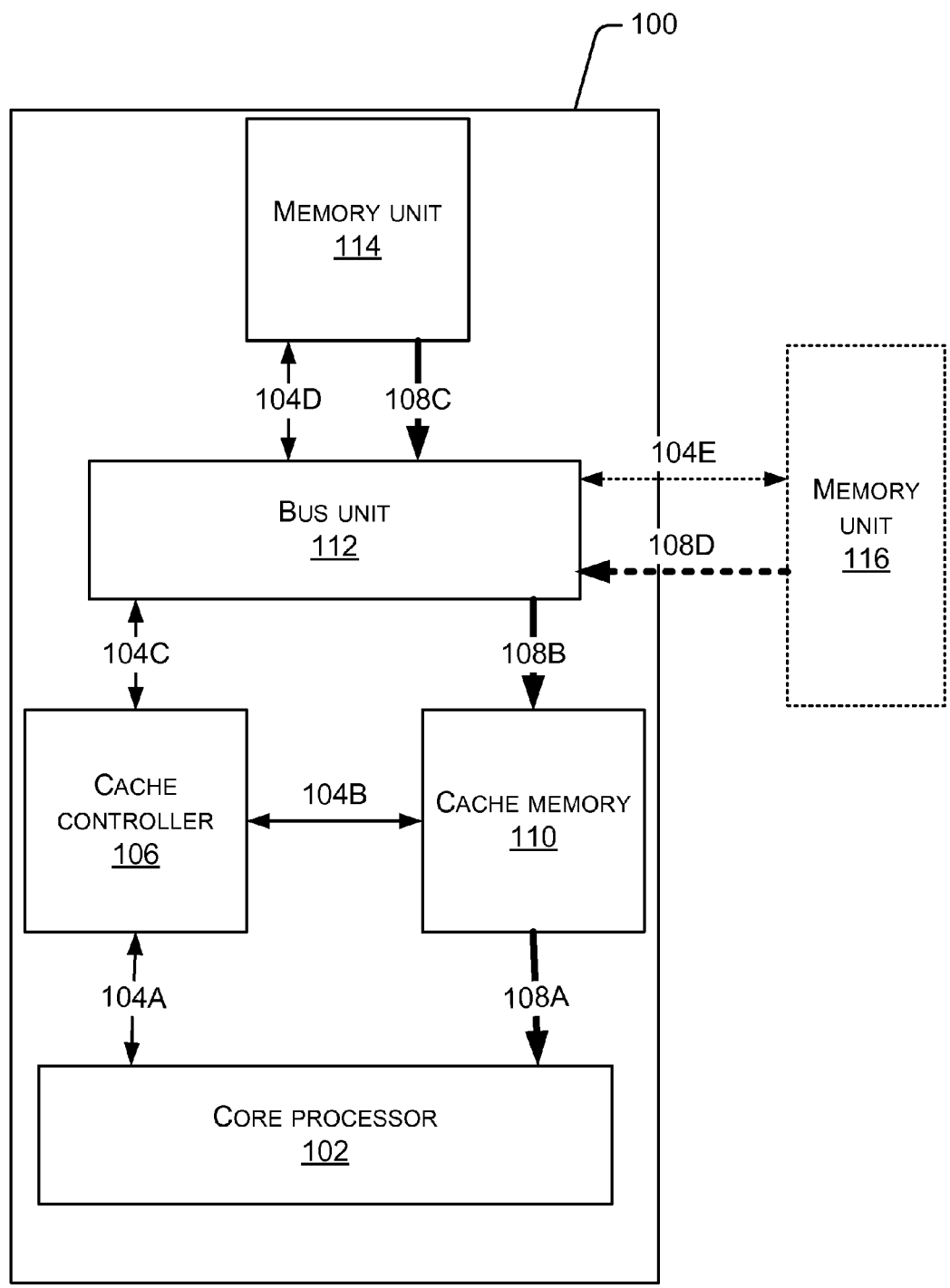
FIG. 1 shows an exemplary block diagram of a computing device containing cache memory and memory unit.

FIG. 1 shows an exemplary block diagram of a computing device 100. The computing device 100 may be a cellular phone, wireless media device, personal digital assistant (PDA), handheld computer, laptop, desktop computer, or other device that uses cache memory and/or a memory unit.

Within this computing device 100 is a core processor 102. The core processor 102 may be a general purpose central processing unit (CPU), microcontroller, or a specialized processor.

The core processor 102 is coupled via a control path 104A to cache controller 106. The cache controller 106 manages, via its coupled control path 104B, the cache memory 110 on behalf of the core processor 102. The cache memory 110 may receive data (including instructions) via instruction data fetch path 108B then pass data via instruction data fetch path 108A to the core processor 102.

Cache controller 106 is coupled via control path 104C to bus unit 112. Bus unit 112 is coupled via control path 104D and instruction data fetch path 108C to a memory unit 114. The memory unit 114 is depicted as being within the computing device 100, but external memory unit 116 may additionally or alternatively be provided and coupled to the bus unit 112 via control path 104E and instruction data fetch path 108D.

The core processor 102, cache controller 106, cache memory 110, bus unit 112, and memory unit 114 may be discrete devices, integrated into a single chip, or various permutations of discrete and integrated components.

Figure 2:
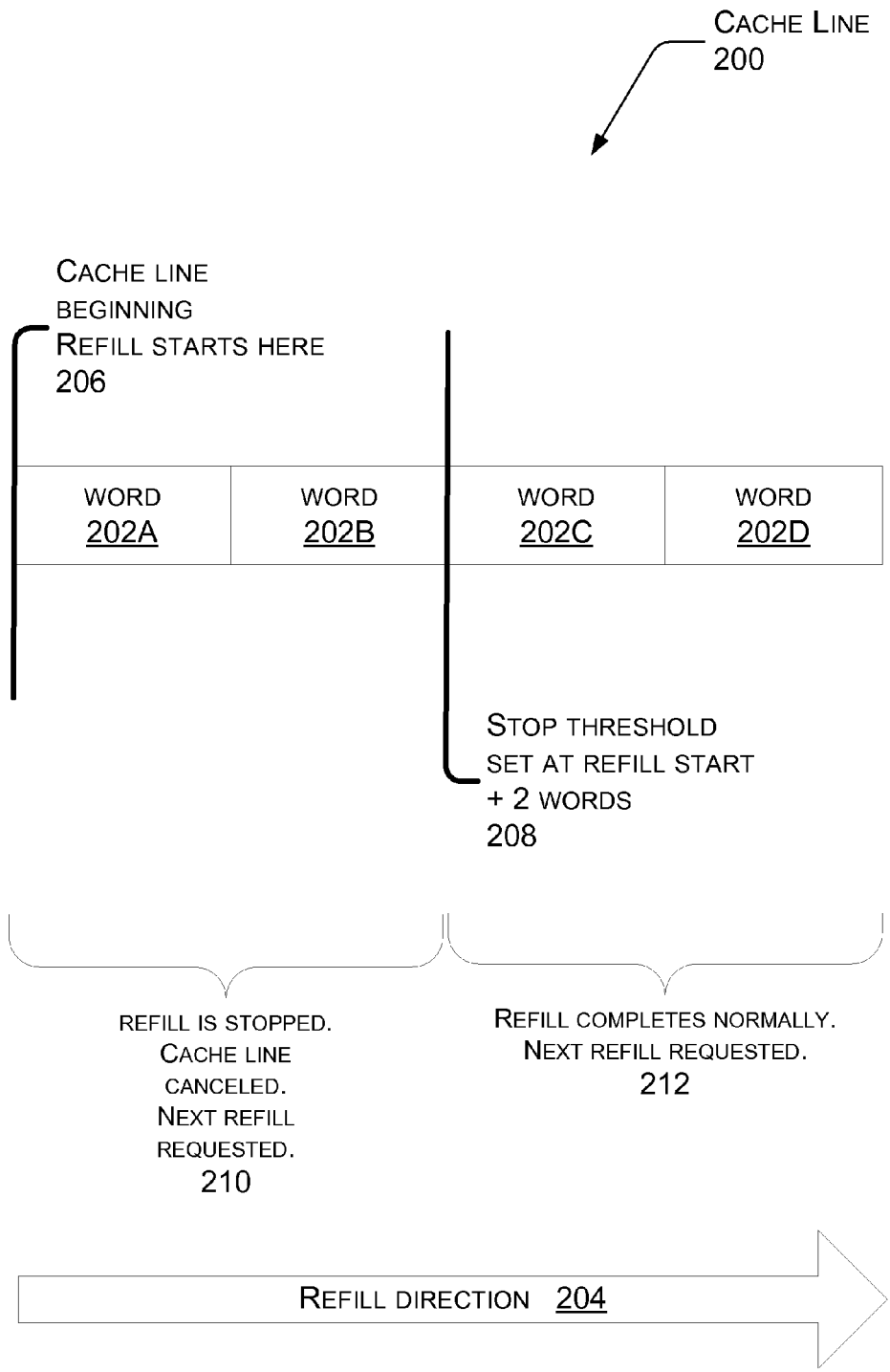
FIG. 2 shows a schematic of an exemplary cache line in cache memory where no critical word first is used.

FIG. 2 shows a schematic of an exemplary cache line 200 in cache memory where no critical word first is used.

In this schematic, a cache line 200 is comprised of words 202A-D filled in the direction 204, shown in FIG. 2 as left to right. Cache line refills start at 206 which is also the beginning of the cache line, filling word 202A, then word 202B and so forth. A stop threshold has been set at the refill start 206 plus two words at 208 between words 202B and 202C. The stop threshold is used to determine whether to stop the cache line refill or continue with the normal cache line refill.

For example, during a cache line refill following a first cache miss for a first requested word, a second cache miss for a second requested word may occur during refill time period 210, which encompasses words 202A and 202B. The cache line refill will continue until the first requested word is received by the processor. During refill time period 210 the stop threshold 208 has not yet been reached and, assuming that the first requested word has been received by the processor (i.e., suppose 202A was the requested word), the refill is stopped, the cache line is canceled, and a next refill from the second cache miss is requested. When a cache line is canceled, the cache line is not written to the cache memory.

Where 202A was the first requested word, if the second cache miss occurs during time period 212 which encompasses words 202C and 202D, the cache line refill will complete because the second cache miss has occurred after reaching or exceeding the stop threshold 208.

If word 202C was the first requested word, and a second cache miss occurs before or after the stop threshold 208, the cache refill completes by refilling words 202C and 202D and a next refill from the second cache miss is requested. The refill process finishes refilling the cache line because the first requested word is in time period 212 which is after the stop threshold 208. Setting the threshold therefore allows control of the refill process. This control over the process facilitates cancellation of a cache line refill without waiting to refill the entire line when the cache miss occurs early in the refill process. Facilitating cancellation, the processor is thus freed up from waiting for the cache line to complete, thus reducing refill latency.

Figure 3:
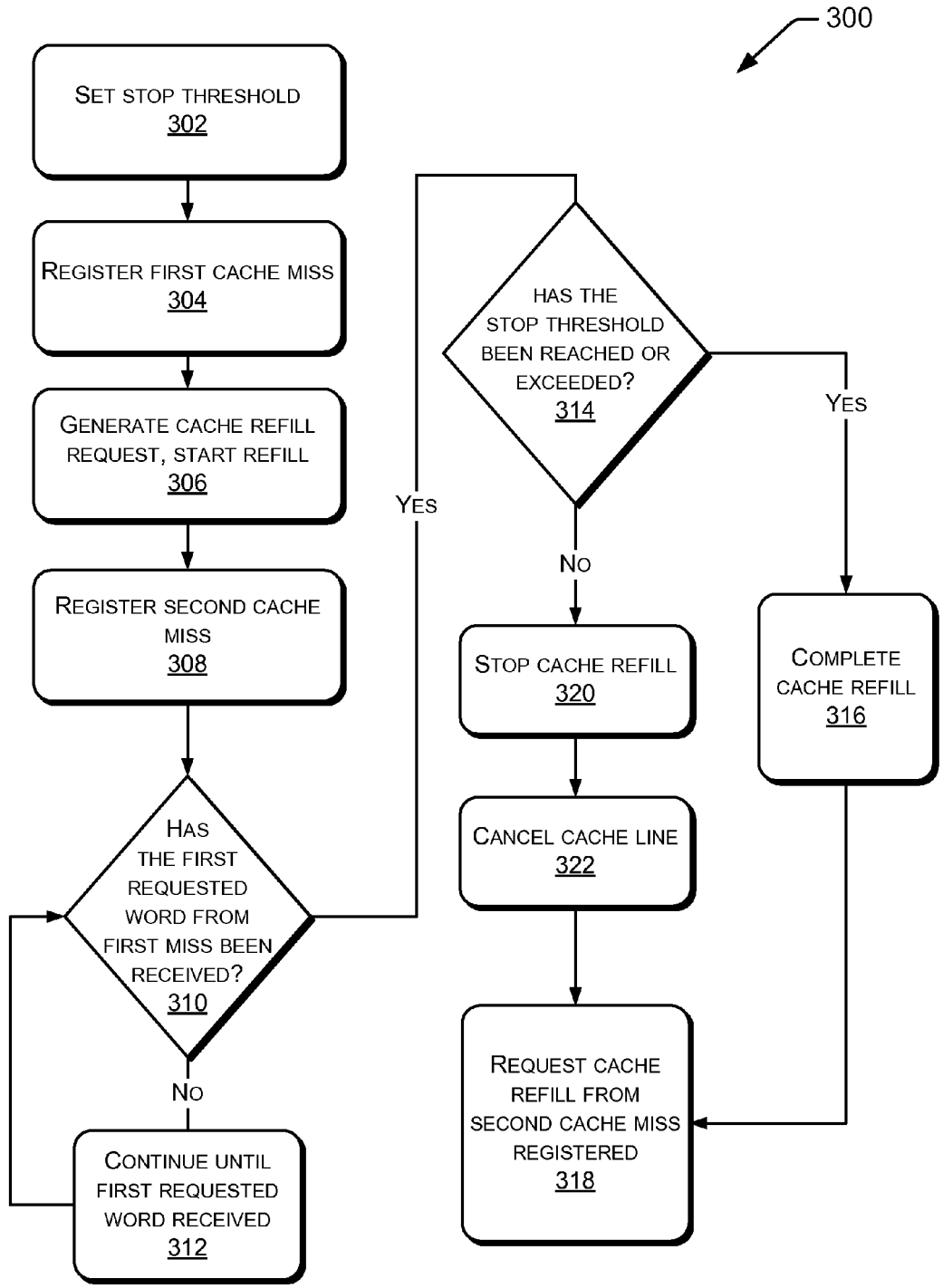
FIG. 3 shows a flow diagram of an exemplary cache memory refill control for the cache line depicted in FIG. 2 with a stop threshold being used and no critical word first.

FIG. 3 shows the exemplary cache refill control process for the cache line depicted in FIG. 2, i.e., when no critical word first is used.

At 302, the stop threshold (shown in the FIG. 2 on cache line 200 at 208) is set. The stop threshold may be either fixed or dynamically adjustable. This threshold may be set manually or automatically, by a user, by an optimization method, or by algorithm or other suitable process and may be set at time of manufacture, or at any other suitable time. The threshold may be based upon clock cycles, number of words in the cache line, count of misses, or other suitable parameters. Possible thresholds are determined by the granularity of the suitable parameters. For example, if the parameter is "words" and the cache line contents are N words long, then the possible threshold values are 0 to N−1. One or more bits in memory may be used to implement this threshold.

At 304, a request has been made of the cache for a first requested word which is not present in the cache, resulting in a first cache miss. Cache misses may be monitored by a cache controller, such as cache controller 106, shown in FIG. 1.

At 306, as a result of this first cache miss, a cache refill request is generated, and the cache line refill is started. The cache refill request may be generated by the cache controller.

At 308, a second requested word, which is not in the cache is requested. Thus, a second cache miss is registered.

At 310, a determination is made: If the first requested word has not been received, at 312 the cache line refill continues until the first requested word is received. If the first requested word has been received, another determination is made at 314.

At 314, a determination is made: If the stop threshold (as shown, for example, at 208 in FIG. 2) set in 302 has been reached or exceeded, then at 316 the cache refill associated with the first cache miss registered in 304 completes. Following the completion of this cache refill, at 318 cache controller requests the cache refill from the second cache miss registered during step 308.

If at 314 the stop threshold (as shown, for example, at 208 in FIG. 2) set in 302 has not been reached or exceeded, then at 320, the cache refill is stopped without further filling the cache line.

At 322, the cache line in progress is canceled. The stop and cancellation thus frees the processor for further code execution, reducing latency.

At 318, the cache controller requests the cache refill from the second cache miss registered during step 308. This next cache refill in turn may be stopped and canceled based on the same or different stop threshold parameters as those described above.

Although specific details of an exemplary process has been described with reference to FIG. 3 above, it should be understood that certain acts need not be performed in the order described, and may be modified, and/or may be omitted entirely, depending on the circumstances. For example, according to an alternative implementation, after registering a first cache miss 304, the process may proceed to 314 to determine whether the stop threshold has been reached prior to generating the cache refill request at 306.

Moreover, the acts described with reference to FIG. 3 may be implemented by a computer, processor, or other computing device based on instructions stored on one or more computer-readable storage media. The computer-readable storage media can be any available media that can be accessed by a computing device to implement the instructions stored thereon.

Figure 4:
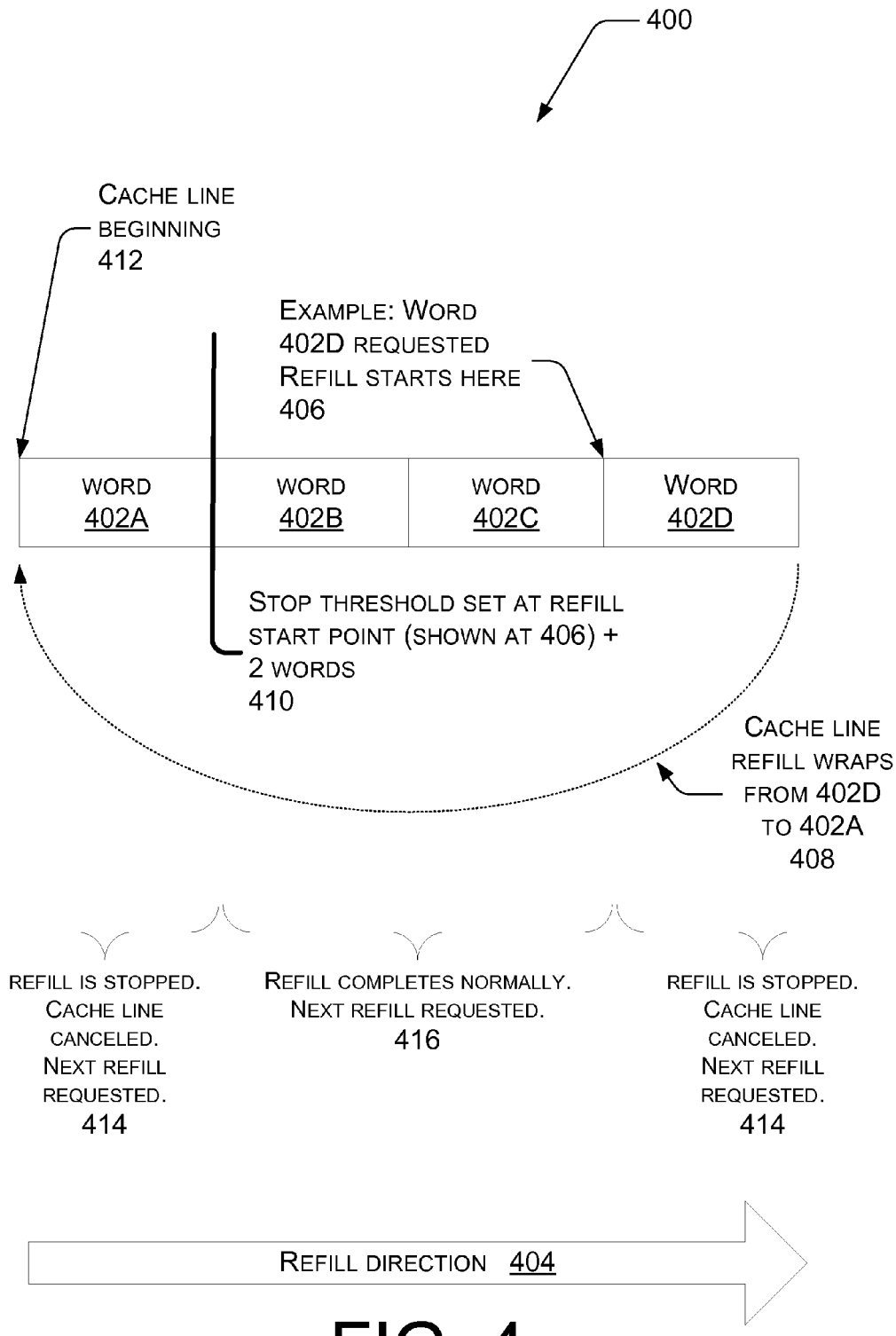
FIG. 4 shows a schematic of an exemplary cache line in cache memory where a critical word first is used.

FIG. 4 shows a schematic of a cache line 400 in cache memory where a critical word first and a stop threshold determined by the critical word first location in the cache line are used. Typically the cache line refill operation starts at the location of the requested word that was missed in the cache memory. When the critical word first (also known as "critical first word," "wrapped fetch," and "requested word first") method is used, a critical (or specific) word is requested from the cache and retrieved first. The cache refill then begins with that critical word first and continues with the refill of the cache line. The critical word first may be sent to a processor as soon as it arrives. When the end of the cache line is reached, the refill wraps to the beginning of the cache line and completes the refill, ending at the critical word.

In this example, a cache line 400 is comprised of words 402A-D filled in the direction 404, shown in FIG. 4 as left to right.

If word 402D is the critical word first which has been requested, it will be retrieved first by a processor and the cache refill begins at a point 406. Upon reaching the end of the cache line 400, the refill wraps around 408 to beginning point 412 of the cache line 400.

Because of this retrieval and subsequent refill which is not in the linear order of a cache line, it becomes useful to set a stop threshold determined by the critical word first location within the cache line. In this example, a stop threshold is set to the requested word plus two words. Given the starting point 406 at 402D and the wrap 408 back to word 402A, the stop threshold is thus set between words 402A and 402B at 410 during this cache refill.

If the second cache miss occurs during refill time 414 which encompasses word 402D wrapping around to 402A, because the requested word has been retrieved already, the cache refill is stopped, the cache line is canceled, and the next refill is requested.

If the cache miss occurs during refill time 416, the cache refill continues refilling words 402B, 402C, and so forth. The cache refill completes normally and the next refill is requested.

Figure 5:
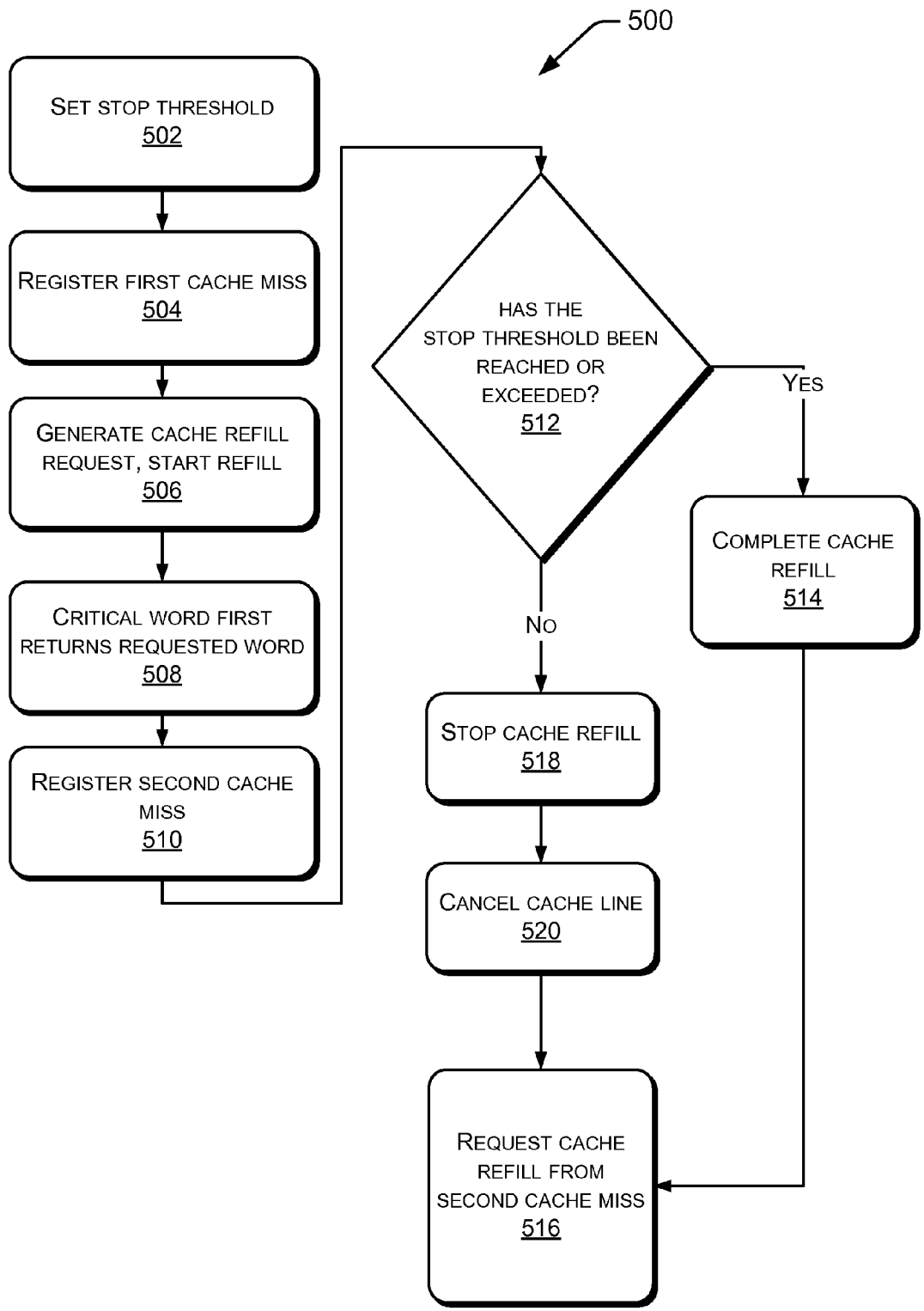
FIG. 5 shows a flow diagram of the exemplary cache memory refill control for the cache line depicted in FIG. 4 when a critical word first and stop threshold determined by the critical word first location in the cache line are used.

FIG. 5 shows the exemplary cache refill control process for the cache line depicted in FIG. 4, i.e., when a critical word first and a stop threshold determined by the critical word first location in the cache line are used.

At 502, the stop threshold depicted in FIG. 4 as stop threshold 410 is set. In this example, the stop threshold is set to plus two words from the critical word. The stop threshold may be either fixed or dynamically adjustable. The threshold may be set manually or automatically, by a user, by an optimization method, or by algorithm or other suitable process and may be set at time of manufacture, or at any other suitable time. The thresholds may be based upon clock cycles, number of words in the cache line, count of misses, or other suitable parameters. Possible thresholds are determined by the granularity of the suitable parameters. For example, if the parameter is "words" and the cache line contents are N words long, then the possible threshold values are 0 to N−1. One or more bits in memory may be used to implement this threshold. Furthermore, a threshold may be variable depending upon its relationship with other thresholds or the critical first word, as desired to optimize performance.

At 504, a request has been made of the cache for data which is not present in the cache, resulting in a first cache miss. Cache misses may be monitored by a cache controller, such as cache controller 106, shown in FIG. 1.

At 506, as a result of this first cache miss, a cache refill request is generated and the cache line refill is started. The cache refill request may be generated by the cache controller.

At 508, a critical word first function returns the requested word from the cache line.

At 510, a second cache miss is registered during the cache line refill resulting from the first cache miss.

At 512, a determination is made: If the stop threshold (as shown, for example, at 410 in FIG. 4) set at 502 has been reached or exceeded at the time of the second cache miss, then at 514, the cache refill associated with the first cache miss registered in 504 completes. Because the requested critical word is produced from the cache line first, it is not necessary to make the determination shown at 310 in FIG. 3 which looks to when the word has been received. As shown in the example of FIG. 4, the refill begins at the start of the requested word, e.g., point 406 in FIG. 4. Following the completion of the cache refill, at 516, the cache controller requests the cache refill from the second cache miss registered at 510.

If, however, the stop threshold (as shown, for example, at 410 in FIG. 4) set in 502 has not been reached or exceeded, the process proceeds to 518.

At 518, the cache refill is stopped. The stop threshold has not been reached so the process is stopped without further filling the cache line.

At 520, the cache line in progress is canceled. The stop and cancellation thus frees the processor for further code execution, reducing latency.

At 516, the cache controller requests the next cache refill for the second cache miss 510. This next cache refill in turn may be stopped and canceled based on the same or different stop threshold parameters described above.

Although specific details of an exemplary process has been described with reference to FIG. 5 above, it should be understood that certain acts need not be performed in the order described, and may be modified, and/or may be omitted entirely, depending on the circumstances. For example, according to an alternative implementation, after registering a first cache miss 504, the process may proceed to 512 to determine whether the stop threshold has been reached prior to generating the cache refill request at 506.

Moreover, the acts described with reference to FIG. 5 may be implemented by a computer, processor, or other computing device based on instructions stored on one or more computer-readable media. The computer-readable media can be any tangible available media that can be accessed by a computing device to implement the instructions stored thereon.

Although specific details of exemplary methods have been described above, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

CONCLUSION

For the purposes of this disclosure and the claims that follow, the terms "coupled" and "connected" may have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:
1. A method comprising:
   setting a stop threshold for a cache refill process, wherein the cache refill process includes storing a first quantity of data which is sufficient to fill a cache line in a cache controller, wherein the stop threshold comprises a second quantity of data that has been stored in a cache line since a start of a cache refill, wherein the second quantity of data is less than the first quantity of data;
   registering a first cache miss for a first requested word;
   in response to the first cache miss, starting a first cache refill by storing data in the cache;
   in response to registering a second cache miss during the first cache refill:
     determining an amount of data that has been stored in the cache since the start of the first cache refill;
     stopping the first cache refill when the amount of data that has been stored does not reach or exceed the stop threshold; and
     starting a second cache refill in response to the second cache miss.
2. The method of claim 1 wherein the stop threshold is dynamically adjusted.
3. The method of claim 1 wherein the second quantity of data is a predetermined number of words.
4. The method of claim 1, comprising:
   determining whether the requested word has been stored in the cache since the start of the first cache refill; and
   stopping the first cache refill when the amount of data that has been stored does not meet or exceed the stop threshold and the requested word has been received; and
   starting a second cache refill in response to the second cache miss.
5. The method of claim 4 further comprising: cancelling the cache line when the second cache miss occurs, the stop threshold has not been reached or exceeded, and the requested word has been received.
6. The method of claim 4 further comprising: completing the first cache refill when the second cache miss occurs and the stop threshold has been reached or exceeded before the requested word has been received.
7. The method of claim 6 wherein completing the first cache refill comprises starting at a critical word first in the cache line.
8. The method of claim 1 wherein the second quantity comprises a predetermined number of bits.
9. The method of claim 1 wherein a cache memory is coupled to a memory unit through a bus.
10. A device comprising:
    a processor;
    a cache memory; and
    a cache controller coupled to the processor and the cache memory and configured to:
    registering a first cache miss for a requested word;
    in response to the first cache miss, starting a first cache refill by storing data in the cache, wherein the cache refill process includes storing a first quantity of data which is sufficient to fill a cache line in a cache controller;

in response to registering a second cache miss during the first cache refill:
  determining an amount of data that has been stored in the cache since the start of the first cache refill; and
  stopping the first cache refill when the amount of data that has been stored does not reach or exceed a stop threshold, wherein the stop threshold comprises a second quantity of data that has been stored in a cache line since a start of a cache refill, wherein the second quantity of data is less than the first quantity of data; and
  starting a second cache refill in response to the second cache miss.

11. The device of claim 10 wherein the stop threshold may be dynamically adjusted while in operation.

12. The device of claim 10 wherein the stop threshold is stored as at least one bit in a cache controller memory or system memory.

13. The device of claim 10 wherein the second quantity of data is a predetermined number of words.

14. The device of claim 10 wherein the second quantity of data is a predetermined number of bits.

15. A device comprising:
  a processor;
  a memory unit coupled to the processor;
    a cache memory unit coupled to the memory unit and including a cache line; and
    a cache controller coupled to the cache memory unit and the processor and configured to:
      request a critical first word from the cache line,
      register a first cache miss,
      generate a first cache refill request following the first cache miss, wherein the first cache refill request comprises instructions to fill the cache line in the cache memory unit with a first quantity of data sufficient to fill the cache line retrieved from the memory unit,
      start a first cache refill in response to the generated first cache refill request;
      register a second cache miss during the first cache refill;
      determine whether the critical first word has been received;
      determine whether a stop threshold has been met, wherein the stop threshold comprises a second quantity of data that has been stored in a cache line since a start of a cache refill, wherein the second quantity of data is less than the first quantity of data;
    stop the started first cache refill when the critical first word has been received and the stop threshold has not been reached or exceeded.

16. The device of claim 15 wherein the stop threshold may be dynamically adjusted while in operation.

17. The device of claim 15 wherein the stop threshold is stored as at least one bit in a cache controller memory or system memory.

18. The device of claim 15 wherein the second quantity of data is a predetermined number of words.

19. The device of claim 15 wherein the second quantity of data is a predetermined number of bits cache memory unit is coupled to the memory unit through a serial bus.

* * * * *